United States Patent [19]

Banner

[11] Patent Number: 4,633,577
[45] Date of Patent: Jan. 6, 1987

[54] ARMATURE WINDING METHOD AND APPARATUS

[75] Inventor: Alvin C. Banner, Kettering, Ohio

[73] Assignee: The Globe Tool & Engineering Company, Dayton, Ohio

[21] Appl. No.: 662,710

[22] Filed: Oct. 19, 1984

[51] Int. Cl.$^4$ .............................................. H01R 43/06
[52] U.S. Cl. ........................................ 29/597; 29/733; 29/564.6
[58] Field of Search ................. 29/596, 597, 598, 733, 29/735, 564.6; 242/7.03, 7.05 B

[56] References Cited

U.S. PATENT DOCUMENTS

| 3,628,229 | 12/1971 | Biddison et al. | 29/205 C |
| 3,713,208 | 1/1973 | Doyle | 29/597 |
| 3,713,209 | 1/1973 | Biddison | 29/597 |
| 3,783,501 | 1/1974 | Biddison et al. | 29/597 |
| 3,785,034 | 1/1974 | Bucholtz | 29/205 |
| 3,812,577 | 5/1974 | Compton et al. | 29/597 |
| 3,857,172 | 12/1974 | George et al. | 29/597 |
| 3,921,284 | 11/1975 | Bucholtz et al. | 29/597 |
| 3,927,456 | 12/1975 | Dammar | 29/205 |
| 3,927,469 | 12/1975 | Dammar | 29/597 |
| 3,927,843 | 12/1975 | Dammar | 242/7.05 B |
| 4,027,827 | 6/1977 | Biddison | 242/7.05 B |

OTHER PUBLICATIONS

The Globe Tool & Engineering Company, drawings Nos. H-65965, H-65984, H-65985 and H-65986, dated 9/71.

Primary Examiner—Howard N. Goldberg
Assistant Examiner—P. W. Echols
Attorney, Agent, or Firm—Roger S. Dybvig

[57] ABSTRACT

A double flier armature winding machine is provided with two wire trimming assemblies, one for each flier, each having a trimming head with a sharp edge against which a lead wire is severed by abruptly moving a wire clamp gripped to the lead wire in a direction to cause the wire to be stretched over the sharp edge.

12 Claims, 12 Drawing Figures

ARMATURE WINDING METHOD AND APPARATUS

SUMMARY OF THE INVENTION

This invention relates to an armature winding method and apparatus and especially to the severing of lead wires of armatures wound by an automatic double flier winding machine. As will become apparent, the invention is equally applicable to single flier winding machines.

The present invention is intended for use in the winding of armatures of the type having an armature core and a commutator mounted in spaced relation on an armature shaft and wherein the commutator is provided with coil lead-receiving hooks or tangs. As used herein, the term "start wires" refers to the wire segments leading to the first coils wound by the fliers. The term "finish wires" refers to the wire segments extending from the last coils wound. In double flier armature winding machines having two fliers, there are two start and two finish wires.

Various methods have been used to sever the wire segments between the fliers and the armatures being wound. For the last several years, it has been a common practice to equip winding machines with mechanisms for severing the start and finish wires close to the commutator tangs while the armature being wound is located in the winding station.

U.S. Pat. No. 3,812,577, granted to Jerry L. Compton and David R. Seitz on May 28, 1974, discloses an approach to the severing of the coil lead wires from an armature while it is located in the winding machine wherein either one or both of the start and the finish wires are severed by relative movement of wire clamps gripping the wires and the armature. As a result of such relative movement, the wires are stressed at the tangs and severed at or quite near the edges of the tangs. Accordingly, there is no excess wire left extending from the tangs and further trimming operations are unnecessary.

The approach disclosed in said U.S. Pat. No. 3,812,577 is frequently used, especially for relatively fine wire applications wherein there is a relatively high probability that the wire will break at the edge of the tang. There are circumstances in which start wires connected to tangs in accordance with the teachings of said U.S. Pat. No. 3,812,577 may be pulled off the tangs when the fliers commence rotation to wind the first coils. This problem may be cured in many cases by looping each start wire two times around its associated tang in the manner described in U.S. Pat. No. 3,713,208, granted to James N. Doyle on Jan. 30, 1973. However, it is not always desirable to employ the methods of said Doyle '208 patent due to the geometry of the commutator tangs. For example, a tang may be so configured that the additional start wire loop has an adverse effect upon the connection of the finish wire or upon the subsequent processing of the armature, such as the usual hot-staking of the tangs and the wire loops Occasionally, wires severed from tangs in accordance with said Compton et al. '577 patent break at locations between the tangs and the wire clamps in which event the excess wire lengths must be manually trimmed. This can present a costly and difficult manufacturing problem when using modern high speed production equipment.

An object of this invention is to provide an improved method and apparatus for severing coil lead wires from an armature. In accordance with this invention, either one or both of a start wire and a finish wire can be reliably severed closely adjacent its associated commutator tang by positioning a sharp trimming edge of a trimmer member immediately adjacent such tang with the wire to be severed extending across the trimming edge, and moving a wire clamp that grips the wire away from the trimmer member whereupon the wire becomes stretched and breaks at the trimming edge because of the high stress concentration experienced by the wire at that point. The trimming edge can be accurately machined to a sharp edge so that the stress concentration in the wire at the trimming edge is exceedingly high. Accordingly, the wire breaks at the trimming edge a very high percentage of the time.

It is now conventional in flier-type armature winding machines to have a shield assembly including an inner shield and an outer shield. The inner shield is notched to expose a pair of commutator tangs for making lead wire connections. The other shield covers the commutator tangs exposed through the inner shield notches to prevent the wire segments extending from the fliers from engaging the aforementioned commutator tangs, the outer shield being retracted from the path of the wire segments when the lead wire connections are to be made.

A further object of this invention is to provide a method and apparatus for coupling the wire trimming members to the outer shield so that the trimming members are appropriately moved into and out of position for the wires to be severed in response to movements of the outer shield. When moved out of their wire-severing positions, the trimming members are located so as not to interfere with the winding of coils. In the presently preferred form of this invention, each wire trimming member is supported by a pivotally mounted arm and a driving connection is provided between the arm and the outer shield whereby each arm is caused to pivot in response to movements of the outer shield. Such driving connection could take various forms; a simple driving connection in the form of a pin and a cam slot is adequate.

In my U.S. Pat. No. 4,459,742, issued July 17, 1984, a method and an apparatus are disclosed for increasing the slot fill of armatures wound on flier-type armature winding machines wherein the outer shield is retracted during a portion of each winding cycle for each coil to permit the fliers to draw the wires nearer to the armature shaft and thus deeper into the coil receiving slots. During such times, the inner shield is rotated to position its notches outside of the paths of the wire segments being wound into coils. Another object of this invention is to provide a method and an apparatus for winding armatures having a high slot fill wherein the outer shield that is drivingly connected to the trimming member carrying arms of this invention may be selectively located in an intermediate position during portions of the cycle of the winding of an armature, in addition to a fully extended position and a fully retracted position, so that the advantages of retracting the outer shield to obtain a high slot fill may be obtained without retracting the outer shield so far that the trimming members of this invention are moved to positions wherein they would interfere with the winding of the coils.

Other objects and advantages of this invention will become apparent from the following description and the drawings.

BRIEF DESCRIPTION OF THE DRAWINGS

FIG. 1 shows parts of the machine and an armature in readiness for the looping of a start wire about a commutator tang in preparation for the winding of coils on the armature.

FIG. 7 also indicates the relative rotary position of the armature core by phantom lines. Here it may be noted that only one flier is illustrated in the FIGS. 3, 4, 5, and 6 whereas FIG. 7 shows a section of each wire leading to the fliers.

DESCRIPTION OF THE PREFERRED EMBODIMENT

Referring to the drawings, this invention is directed to an improved method and apparatus for winding the type of armature, generally designated 20, having a laminated core 22 and a commutator 24 mounted on an armature shaft 26. The commutator 24 has a plurality of circumferentially spaced commutator segments 28 (FIGS. 11 and 12) terminating in tangs 30 adjacent one end of the laminated core 22. The core 22 has a plurality of radially extending, outwardly opening, coil-receiving slots 32 separated by T-shaped teeth 34 which receive coil windings (not shown). As well known, the coil windings are wound from insulated wire and are completely isolated from the armature core 22 and the shaft 26 by plural insulating members including U-shaped slot liners 38, insulating core end pieces 40, an insulating sleeve 42 between the core 22 and the commutator 24, and an insulating sleeve 44 adjacent the opposite end of the core 22. After the winding is completed, insulating wedges (not shown) are extended through each of the slots 32 between the windings and the outward openings to the slots 32.

Figure 1:
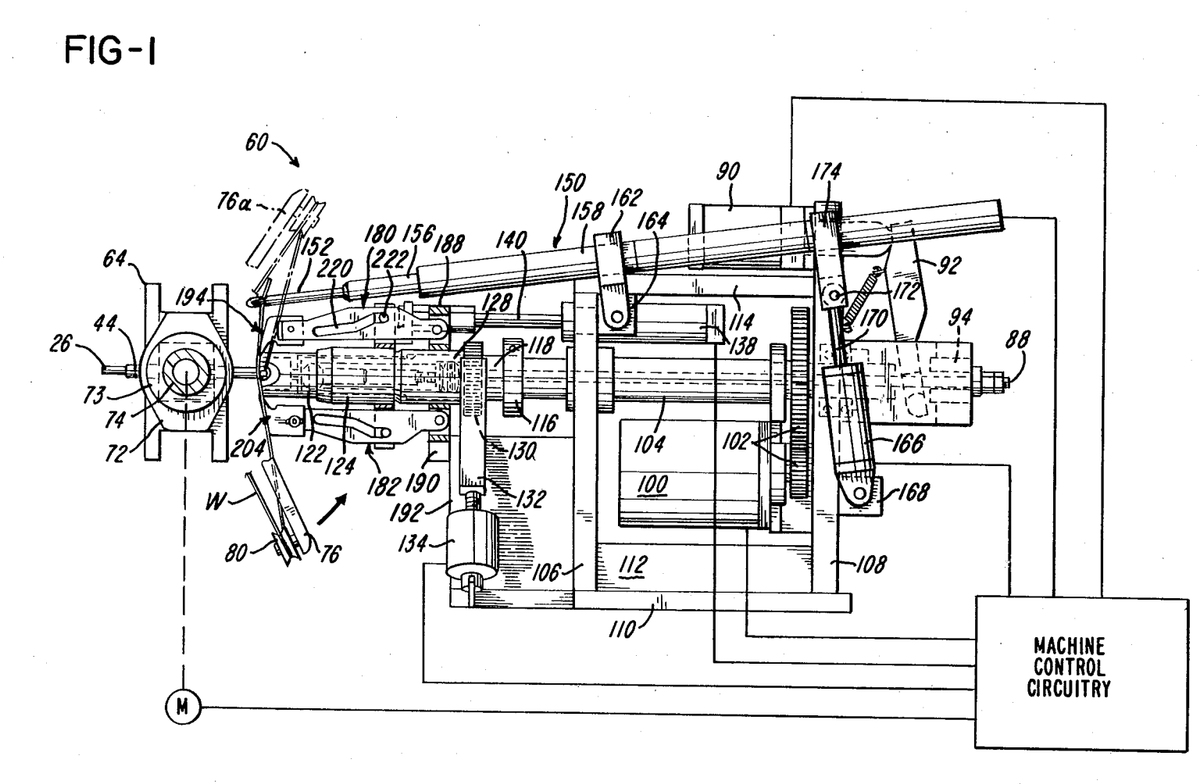
FIG. 1 is a partially diagrammatic and simplified side elevational view of a portion of an armature winding machine in accordance with this invention with the machine control circuitry shown in simplified diagrammatic form.
Figure 2:
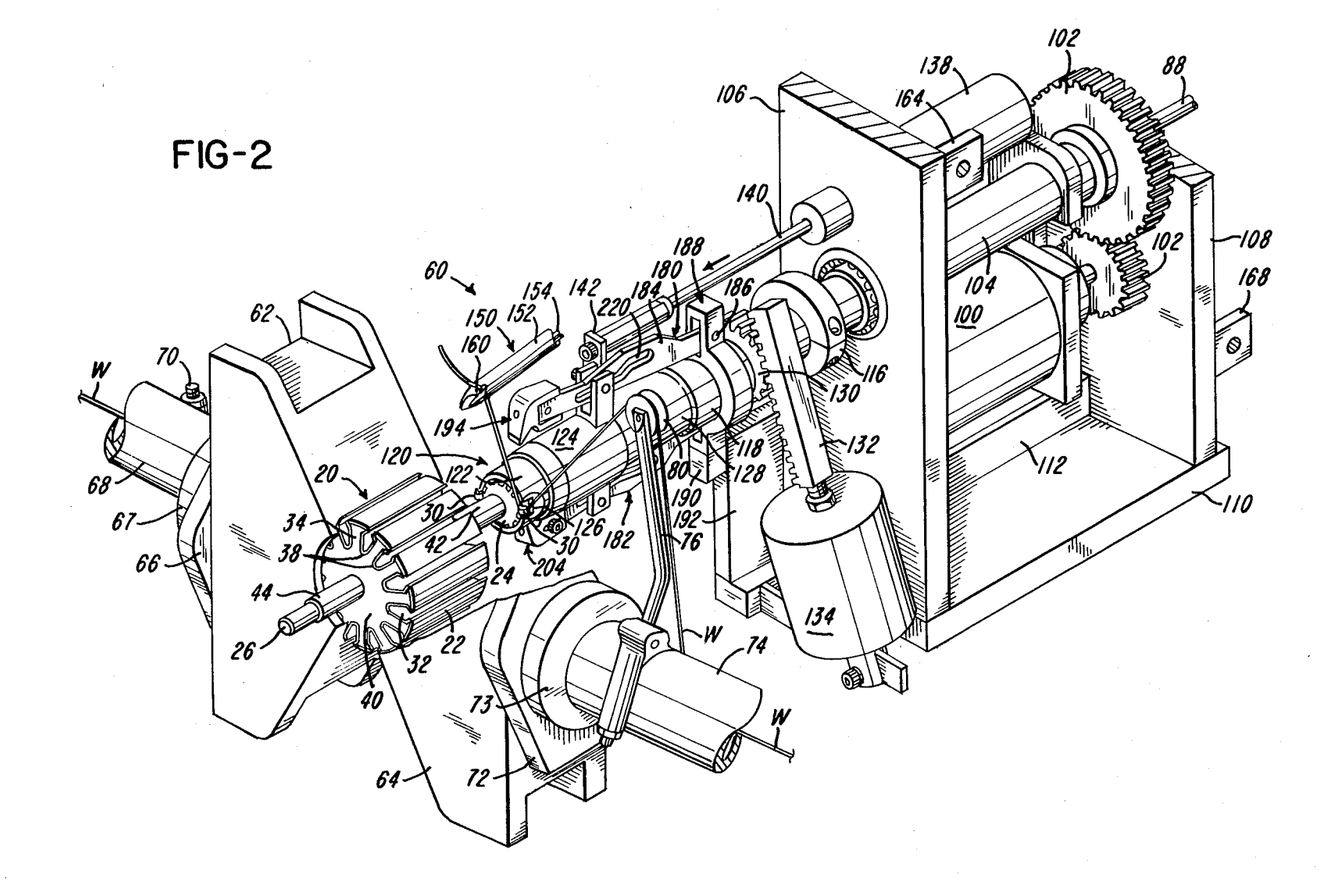
FIG. 2 is a simplified perspective view, with parts broken away, of the machine of FIG. 1 illustrating the parts after the start wire has been partially looped about the selected commutator tang.

With reference to FIGS. 1 and 2, an armature winding machine in accordance with this invention is generally designated 60 and includes left and right side (as viewed in FIG. 2) chucks or winding forms, designated 62 and 64 respectively, that receive the armature 20 between the confronting concavely curved surfaces thereof. The left side winding form 62 is mounted upon a mounting plate 66 mounted by a bearing (not shown) in a bearing housing 67 that rotatably receives a flier spindle 68 on which is affixed a left side flier 70 that is only partly visible in FIG. 2. The right side winding form 64 is similarly mounted upon a mounting plate 72 mounted by a bearing (not shown) in a bearing housing 73 that rotatably receives a flier spindle 74 for a right side flier 76. As conventional, wire W is dereeled under tension from a supply spool (not shown) and coursed through the right side spindle 74 around a spindle exit pulley (not shown) mounted for rotation theron and a flier pulley 80 mounted for rotation at the terminal end of the right side flier 76. Another strand of wire W is drawn under tension from another supply spool (not shown) through the left side spindle 68 and around a spindle exit pulley (not shown) and a left side flier pulley (not shown). As well known to those skilled in the art, the spindles 68 and 74 and, accordingly, the fliers 70 and 76, are simultaneously rotatably driven as by a spindle drive motor M schematically represented in FIG. 1, for winding coils two at a time in spaced pairs of coil receiving slots 32.

During the winding procedure, the end of the armature shaft 26 adjacent to the commutator 24 is gripped by a collet 86, the construction and operation of which may be entirely conventional and form no part of this invention. Briefly, the collet 86 may be operated by movement of a collet compression rod 88 which is biased to the left as viewed in FIG. 1, by spring washer means 89 to cause the collet 86 to grip the armature shaft 26. The grip of the collet 86 may be released by moving the collet compression rod 88 away from the collet 86, i.e. to the right as viewed in FIG. 1, by operation of a collet operating cylinder 90 which acts on a spring biased drive link 92 adapted to engage a sliding collar 94 that engages and moves the collet compression rod 88.

In preparation for winding the coils and during the winding cycle, the armature must be rotated as necessary to properly align its coil receiving slots with the winding forms 62 and 64 and to enable the appropriate connections to the commutator tangs to be made. Various forms of armature rotator devices may be used for this purpose and the details of construction and operation thereof form no part of this invention. One such rotator device is shown for example in the U.S. Pat. No. 3,673,878 issued to John M. Biddison on July 4, 1972. (The Biddison patent also discloses a collet assembly that could be used in lieu of that described above.) A preferred form of armature rotator device is shown in FIG. 1 that includes a stepping motor 100 which, through gears 102, drives a rotator spindle 104 that is hollow to receive the collet compression rod 88. The rotator spindle 104 and the compression rod 88 are appropriately mounted for rotation within front and rear frame plates 106 and 108, respectively, of a rotator support frame including a base plate 110, a frame brace plate 112, and a frame top plate 114. The rotator spindle 104 has a reduced diameter portion located in front of the front frame plate 106 to which is clamped, by a clamping ring 116, a collet retainer 118. Accordingly, and as more fully described in the above mentioned Biddison U.S. Pat. No. 3,673,878, the collet 86 when engaged with the armature shaft will be caused to rotate with the rotator spindle 104.

The armature winding machine 60 further includes a commutator shield assembly generally designated 120 comprising an inner shield 122 and an outer shield 124. The inner shield 122 comprises a hollow, cylindrical body member that surrounds the commutator 24 and has a pair of opposed, tang-exposing notches 126 in its forward end, i.e. the end closest to the winding forms 62 and 64. The purpose of the inner shield notches 126 is to expose two diametrically opposed commutator tangs 30, such tangs being termed "start tangs" herein, located in positions wherein the start and finish wires can be connected to them. In the machine 60, the start tangs are located in the generally horizontal plane at which are referred to as the "3:00 o'clock" and the "9:00 o'clock" positions when coil lead wire connections are to be made to the tangs 30.

In many winders, such as that disclosed in the aforementioned Biddison U.S. Pat. No. 3,673,878, the inner shield is located in a fixed position, moving neither axially nor rotatably and, as will appear below, the present invention may be used with such winders. The winder 60 illustrated in the drawings herein is equipped to practice the invention described in my aforementioned U.S. Pat. No. 4,459,742, insofar as it increases slot fill by a retraction of the outer shield 124 while each coil is being wound and therefore also includes a mechanism for rotating the inner shield to move its notches 126 to the "6:00 o'clock" and the "12:00 o'clock" position to avoid hooking wires at the "3:00 o'clock" and "9:00 o'clock" positions while coils are being wound. Accordingly, the inner shield 122 has a rearwardly extending portion 128, that may optionally be of an enlarged diameter, that is surrounded by a pinion 130 affixed thereto and drivingly engaged by a rack 132 driven by an inner shield rotating cylinder 134. The inner shield assembly comprising the inner shield 122 and the pinion 130 are held in an axially fixed position by suitable means to prevent axial movement thereof. Such means could comprise a bifurcated plate 136 shown in FIG. 5 having a notch in which the pinion 130 is trapped to prevent axial movement thereof. The plate 136 may be attached to a fixed part of the machine frame and functionally corresponds to the bifurcated plate 136 shown in my said U.S. Pat. No. 4,459,742. Plate 136 is not shown in other figures of the drawings to avoid a confusion of lines.

The outer shield 124 is advanced and retracted from a commutator tang shielding position by an outer shield actuator 138 mounted on the front frame plate 106 and having a piston rod 140 connected to a bracket 142 that is connected to or integral with the outer shield 124. For reasons that will become apparent from the ensuing description, the outer shield actuator 138 is a compound cylinder capable of positioning the outer shield 124 selectively in any one of three positions, namely, a fully extended position, a fully retracted position, and a partly retracted or intermediate position. Briefly, in its fully extended position, shown in FIGS. 3 and 4, the end of the outer shield 124 confronting the armature core 22 surrounds the corresponding end of the inner shield 122 and, accordingly, shields the commutator tangs 30 otherwise exposed by the inner shield notches 126. In its fully retracted position, shown in FIGS. 1 and 5, such end of the outer shield is located in a maximally spaced location from the armature core 22 and exposes a substantial length of the inner shield 122, including the inner shield notches 126 and therefore also exposes the commutator tangs 30 aligned therewith. In its partly retracted, or intermediate position, illustrated in FIGS. 6 and 8, the outer shield 124 exposes a lesser length of the inner shield for reasons that will be described below.

The armature winding machine 60 of this invention is provided with wire clamps for gripping the wire segments leading to the fliers at the beginning and end of the winding of each armature. Only one such wire clamp, generally designated 150, which is used with the right side flier 76, is illustrated in the drawings. Obviously, the machine 60 also includes a second wire clamp (not shown) used in association with the left side flier 70 and which may be identical to the clamp 150. The clamp 150 may comprise a relatively fixed clamp jaw 152 and a relatively movable clamp jaw 154. With reference to FIG. 1, the fixed clamp jaw 152 is affixed to one piston 156 of an air-powered, compound, clamp operating actuator 158 and the movable jaw 154 is affixed to the other piston (not shown) of the clamp operating actuator 158. In operation, to clamp the wire at the end of the winding of an armature, the relatively fixed jaw 152 is first moved adjacent the wire segment extending from the tang 30 at the "3:00 o'clock" position to the flier pulley 80. The relatively movable jaw 154 is then moved adjacent the wire. The forward end of the relatively fixed jaw 152 has flanges 160 over which the wire is cammed as it moves adjacent the wire. The front, or leading end of the relatively movable jaw 154 is beveled to come into clamping engagement with the part of the wire adjacent the flanges 160.

The wire clamps are pivotally mounted on a fixed part of the machine 60. To this end the clamp 150 is supported by a clamp mounting collar 162 affixed to the clamp operating actuator 158 and pivotally mounted on a bracket 164 affixed to the frame plates 106 and 114. Also, means is provided for pivotally moving the wire clamp 150. Such means is illustrated in FIG. 1 as comprising an air operated clamp pivoting actuator 166 pivotally mounted upon a bracket 168 affixed to the rear frame plate 108 and driving a piston 170 connected by a clevis 172 to a collar 174 affixed to the rearward end of the clamp operating actuator 158. As apparent the clamp pivoting actuator 166 can be energized to retract its piston 170 and thereby pivot the clamp operating actuator 158 about the pivot axis of the mounting collar 162 whereupon the entire wire clamp 150 will rotate in a clockwise direction as viewed in FIG. 1 and the wire clamp jaws 152 and 154 will move generally vertically and generally radially with respect to the axis of the armature shaft. (Here it will be noted that the terms vertical and horizontal are relative and the description proceeds as if the armature shaft 26 is clamped at the winding station in a horizontal orientation. In practice, the shaft could be in a vertical or other orientation.)

Those familiar with armature winding machines will recognize that the wire clamp 150 and the corresponding clamp used with the left side flier 70 which is not shown but which is essentially identical in construction and operation to the wire clamp 150, could be pivoted to cause either the start or the finish wires to be severed at the edges of the tangs about which they are looped as described in said Compton and Seitz U.S. Pat. No. 3,812,577. However, in accordance with one embodiment of this invention, the start wires are trimmed or severed closely adjacent to their associated tangs 30 with the assistance of an upper wire trimming assembly generally designated 180 and a lower wire trimming assembly generally designated 182. The upper wire trimming assembly 180 is used with the right side flier 76 and is therefore disclosed in detail herein. It will be understood that the lower wire trimming assembly 182 is identical in construction and function and will be only briefly described.

The upper wire trimming assembly 180 comprises an elongate arm 184 which is a plate-like member having one end pivotally mounted by a pin 186 to a collar 188 mounted by a bracket 190 to a frame plate 192 affixed to the front frame plate 106. To the opposite end of the arm 104 is mounted a wire trimming head 194 having a sharp edge 196. The wire trimming head 194 comprises a solid metal body in the form of a rectangular solid having a rearwardly opening recess 198 that receives the forward end of the elongate arm 184. A threaded clamp bolt 200 is located in a tapped hole in the forward end of the arm 184 and extends through an oblong slot in the adjacent wall of the wire trimming head 194. (The oblong slot is not shown, but its shape and location identically correspond to the shape and location of the slot 202 in the wire trimming head 204 of the lower wire trimming assembly 182.) An adjusting screw 206 extending through the forward end of the wire trimming head 194 abuts the forward edge of the elongate arm 184. As is apparent, the clamp bolt 200 and the adjusting screw 206 secure the wire trimming head 194 in an adjustably fixed position on the forward end of the elongate arm 184.

Figures 3, 4, 5:
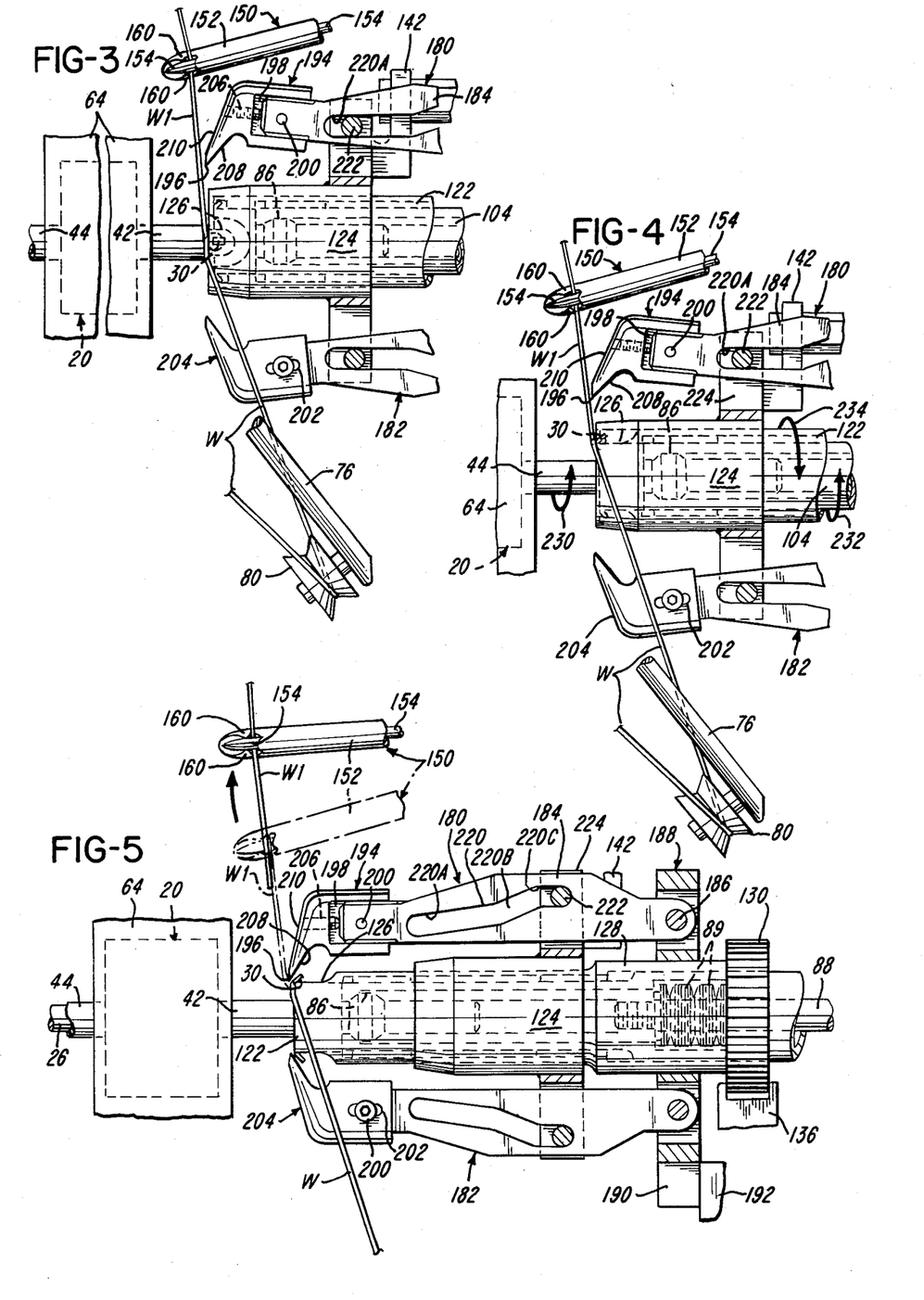
FIG. 3 is a further simplified, side elevational view of parts of the winding machine and the armature of FIG. 1 illustrating the parts after the looping of wire about the selected commutator tang.
FIG. 4 is a side elevational view similar to FIG. 3 showing initial steps taken in preparation for the severing of the start wire after the parts have reached the position illustrated in FIG. 3.
FIG. 5 is a side elevational view similar to FIGS. 3 and 4 but illustrating more parts of the machine and also illustrating the step of severing the start wire.

The sharp edge 196 is preferably machined to a feather or knife edge and is at the junction of two forwardly extending trimming head surfaces 208 and 210 that lie in planes intersecting the armature shaft 26. Accordingly, the sharp edge 196 confronts the shaft 26 and is adapted to be located as shown in FIG. 5 closely adjacent to a commutator tang 30 located at the "12:00 o'clock" position of the commutator 24. When located in this position, the wire trimming head 194 could interfere with the winding of wire into coils. Accordingly, in the presently preferred embodiment of this invention, means are provided to move the trimming head 194 to a position in which it would not interfere with the winding of coils. For this purpose, the wire trimming assembly 180 includes means for pivoting the elongate arm 184 about the axis of pivot pin 186. Such means includes an elongate cam slot 220 in the elongate arm 184 in which is located a pivot drive pin 222 supported by a U-shaped bracket 224 affixed to the top side of the outer shield 124 for movement therewith. With reference to FIG. 5, the cam slot 220 is formed with three sections, namely, a forward section 220A, an intermediate section 220B, and a rear section 220C. In FIG. 5, the outer shield 124 is fully retracted so that the pivot drive pin 222 is located within the rear cam slot section 220C. In such position, the sharp edge 196 is positioned closest to the armature shaft 26. When the outer shield 124 is in its fully extended position, as shown in FIGS. 3 and 4, the elongate arm 184 is caused to pivot in a clockwise direction, as viewed in FIG. 5, to a position wherein the sharp edge 196 is remotely spaced from the commutator tangs 30. As previously mentioned, the outer shield 124 may occupy an intermediate position illustrated in FIG. 6 in which the pivot drive pin 222 is located within the intermediate cam slot section 220B. The shape of the cam slot 220 is such that in the latter position the wire trimming head will be spaced sufficiently from the armature that the winding of coils may proceed without interference.

The apparatus of this invention described above may be used in winding an armature in the following manner. After one armature has been fully wound and removed from between the winding forms 62 and 64, the winding forms are spread apart so that an unwound armature, such as the armature 20, may be positioned in readiness to be wound. The unwound armature is gripped by the collet 86, and thereby held in the winding station, and appropriately oriented relative to the winding forms so that the winding of the armature can commence. It is to be understood that both fliers 70 and 76 are rotated simultaneously for forming lead wire connections and for winding coils. The following description is with reference to the right side flier 76 only, the left side flier undergoing the same movements but rotating in the opposite direction.

In FIG. 1, the phantom lines 76a show the stop position of the flier 76 at the end of the winding and lead trimming cycle of an armature. This is the "upper stop" position and is above a horizontal plane containing the armature shaft. After the unwound armature is gripped by the collet 86, the flier 76 is rotated in a clockwise direction as viewed in FIG. 1 to its "lower stop" position so that the wire extends from the clamp 150 to the flier pulley 80 between the commutator 24 and the core 22. This is the position shown by full lines in FIG. 1. The outer shield 124 is then retracted by energization of its actuator 138 so that the start tangs 30 exposed by the inner shield notches 126 are now fully exposed as shown in FIG. 1. The flier 76 is then rotated in a counterclockwise direction as indicated by the heavy arrow in FIG. 1 to cause the wire to be hooked behind the start tang 30. The hooked condition of the wire about the exposed start tang 30 is shown in FIG. 2. To accomplish this hooking operation, wire lead guides (not shown) of the type disclosed in U.S. Pat. No. 3,713,598 granted to Glen E. Bucholtz and James N. Doyle on Jan. 30, 1973, may, if needed, be employed to force the wire to extend behind the tangs 30. The lead guides would be moved away from the tangs after each hooking operation.

After the hooking of the exposed start tang 30, the outer shield 124 is extended forwardly, that is, toward the armature core, by energization of the outer shield actuator 138. FIG. 2 illustrates the outer shield 124 while it is being extended into covering relation to the exposed start tangs 30. Accordingly, the piston rod 140 is being extended as indicated by the arrow shown adjacent the rod 140 in FIG. 2. Thereafter, as illustrated in FIG. 3, the outer shield 124 is fully extended and the flier 76 is then rotated in a clockwise direction to its lower stop position so that the wire is now completely looped about the start tang 30.

After the looping of the wire about the start tang 30 shown in FIG. 3, the armature is rotated in a top-going direction as indicated by the arrow 230 in FIG. 4 by rotation of the collet drive shaft 104 as indicated by the arrow 232 in FIG. 4. Such rotation is continued until the armature is rotated through substantially 90 degrees about its axis so as to extend the section of wire, designated W1, extending between the start tang 30 and the wire clamp 150 in substantial axial alignment with the start tang 30 and adjacent the path of movement of the wire trimming head 194. At such time, the start tang 30 is substantially radially aligned in the path of movement of the wire trimming head 194. At the same time, the inner shield 122 may be rotated through 90 degrees by energization of the stepping motor 100 so as to place its notches 126 in the "12:00 o'clock" and the "6:00 o'clock" positions in alignment with the start tang 30. The direction of rotation of the inner shield 122 is indicated by the arrow 234 in FIG. 4 to be top-coming, but either direction of rotation would be satisfactory.

The start tang 30 having been moved to the uppermost position in alignment with the wire trimming head 194, the outer shield is then retracted whereupon the start tang 30 is exposed and the wire trimming head 194 driven toward the armature shaft 26. The position thus reached is illustrated in FIG. 5. There, as shown in phantom lines, it will be noted that the wire section W1 extends over the sharp edge 196. The wire may be bent slightly out of its path but it is not severed as a result of the movement of the sharp edge 196 into engagement therewith. Rather, the wire is thereafter severed by being stretched substantially perpendicularly against the sharp edge 196 by an abrupt movement of the end of the wire clamp 150 in a direction substantially perpendicular to the sharp edge 196. Accordingly, in FIG. 5, the wire gripping end of the wire clamp 150 is shown by full lines pivoted substantially radially away from the armature shaft 26 so that the wire segment W1 is severed at its point of engagement with the sharp edge 196.

After the severing of the wire segment W1 (and the simultaneous severing of the corresponding wire segment associated with the left flier 70), the clamp jaws 152 and 154 are retracted from the winding area by energization of the clamp operating actuator 158 and the severed wire segment W1 is later released from the jaws 152 and 154 so that the clamp 150 will be ready to grip the finish wire lead after the armature 20 is fully wound.

Figure 6:
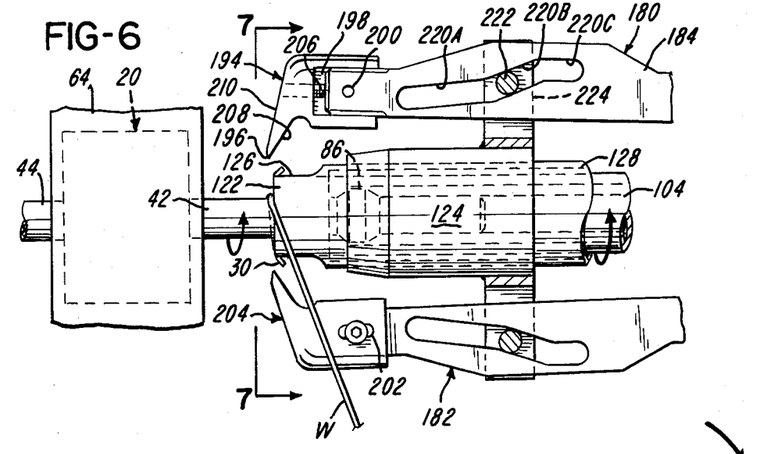
FIG. 6 is a side elevational view similar to FIGS. 3, 4, and 5 illustrating the parts in readiness for the winding of the first coils.
Figure 7:
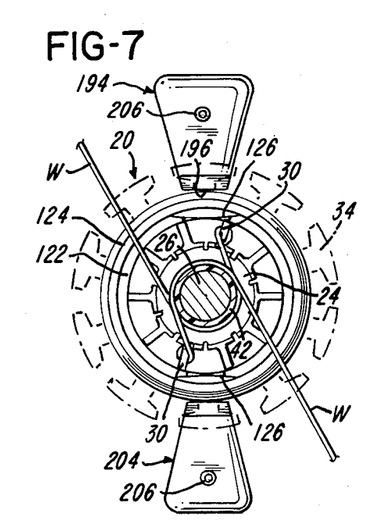
FIG. 7 is a cross-sectional view of the armature taken along line 7—7 of FIG. 6 and showing the trimming members in end elevation and illustrating the parts after they have reached the position shown in FIG. 6.
Figure 8:
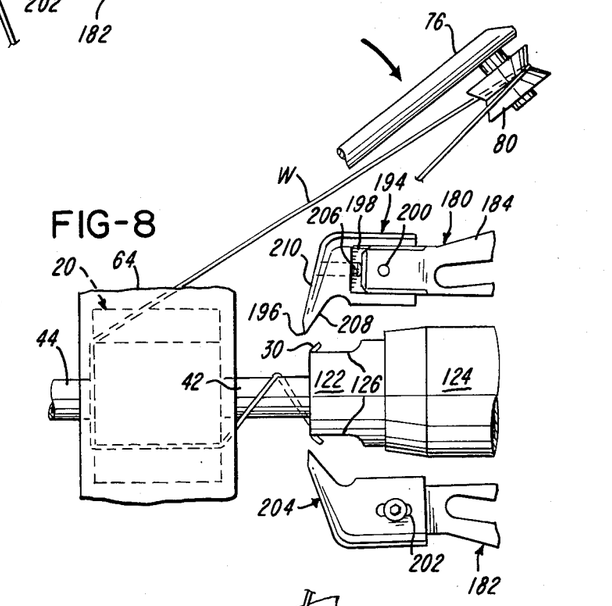
FIG. 8 is a side elevational view similar to FIGS. 3–6 and showing the parts shortly after the commencement of the winding of the first coil by the flier illustrated therein.

Also after the severing of the wire segment W1, the armature may be rotated as illustrated in FIG. 6 to place the proper coil-receiving slots in position to have coils wound therein and the winding of the first pair of coils is commenced. To obtain a greater slot fill, either before or shortly after the winding of the first coils is begun, the outer shield 124 is retracted to the intermediate position illustrated in FIG. 6 so that, during the winding of the coils, the outer shield will not be in a position to interfere with the placement of the wire within the coil-receiving slots as is more fully discussed in my said U.S. Pat. No. 4,459,742. The outer shield 124 is not fully retracted at this time because that would result in the positioning of the wire trimming heads 194 and 204 in the path of the wires being wound into coils. Upon such partial retraction of the outer shield 124, the pivot drive pin 222 enters the sloping intermediate section 220B and the wire trimming heads are thereby caused to be moved radially toward the armature shaft 26, but the cam slot 220 is so constructed that the heads 194 and 204 are sufficiently spaced from the armature shaft that they are located outside of the wire path. This position of the wire trimming heads is illustrated in FIGS. 6, 7, and 8. Since it is possible that the wire may engage the wire trimming heads 194 and 204 anyway, these parts are preferably provided with rounded and polished outer surfaces to avoid substantial abrasion of the wire.

In those cases in which the outer shield is to be extended, rather than retracted, during the winding of coils, there would be no need for the intermediate positon of the outer shield shown in FIGS. 6, 7, and 8, and the shape of the cam slot 220 could be modified accordingly.

Figure 9:
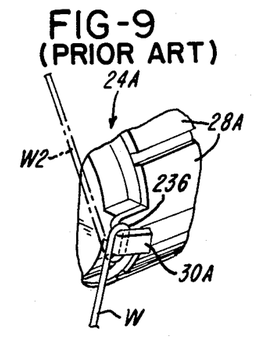
FIG. 9 is a perspective view of a portion of a commutator and showing a start wire looped around a commutator tang and, by phantom lines, illustrating the lead wire severed therefrom in accordance with a prior art method.
Figure 10:
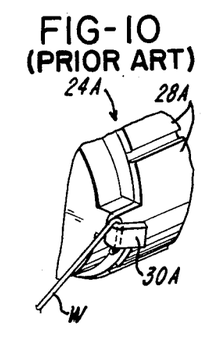
FIG. 10 is a perspective view similar to FIG. 9 showing the condition of the start wire, which has been severed by the prior art method illustrated in FIG. 9, after the commencement of the winding of the first coil.
Figure 11:
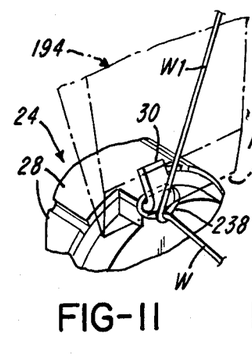
FIG. 11 is a perspective view similar to FIG. 9 but illstrating a wire lead about to be severed in accordance with the instant invention.
Figure 12:
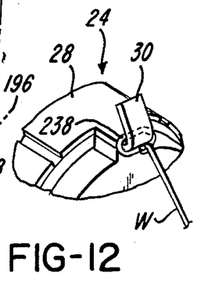
FIG. 12 is a perspective view similar to FIG. 11 and illustrating the condition of the start wire thereof after the commencement of the winding of the first coil in accordance with this invention.

FIGS. 11 and 12 contrast the type of tang connection achieved for the start wires resulting from the practice of this invention with the type of connection illustrated in FIGS. 9 and 10 resulting from the practice of severing the start wire at the tang as disclosed in said Compton and Seitz U.S. Pat. No. 3,812,577. FIG. 9 shows a typical connection to a start tang 30A wherein the wire segment W2 is severed using the Compton and Seitz method wherein a wire clamp, which may be identical to the wire clamp 150, is abruptly moved in a direction perpendicular to the edge of the start tang 30A against which the wire segment W2 is severed. The commencement of rotation of the flier (not shown) to which the wire W shown in FIGS. 9 and 10 extends to wind the first coil causes a force to be exerted on the end of the wire portion 236 looped about the start tang 30A that tends to unloop the wire. FIG. 10 shows a common condition in which the wire has been pulled partly off the tang 30A and is little more than hooked about the back side of the start tang 30A. In many cases such a tang connection is acceptable and the Compton and Seitz method is widely used. However, as mentioned above, there are cases in which the wires will not reliably remain connected to the start tang after the winding commences and, in such cases, other termination procedures or steps must be taken, such as described in said Doyle U.S. Pat. No. 3,713,208, to provide a more secure connection.

In FIG. 11 it will be noted that the point of severence of the wire segment W1 utilizing the instant invention is in alignment with the start tang 30 and quite close to the start tang. As the wire segment W1 is stretched over the sharp edge 196, the immediately adjacent wire segment is bent around the start wire segment leading from the start tang 30 to the flier pulley so that the end of the wire forms a complete, closed loop 238 around the start tang 30 and the severed end of the wire is hooked to the start wire segment extending between the start tang 30 and the flier. It has been observed that, when the associated flier begins to rotate to wind the first coil, the wire loop 238 around the start tang may be displaced, as illustrated in FIG. 12, toward the side of the tang on which the flier is located. However, the loop 238 formed by this invention has a substantially increased integrity in comparison with the type of loop illustrated in FIGS. 9 and 10 and tends to remain closed and looped around the start tang. Although the wire is severed a slight distance from the start tang with the practice of this invention, it is sufficiently close to the start tang that there is little likelihood that the severed end of the start wire will engage and thereby cause an electrical short against the adjacent tangs or wires leading therefrom. Such an occurence is also unlikely because the severed end is located in alignment with the center part of the start tang and not to one side.

It will be appreciated that the location of the sharp edge 196 at the time the severing takes place is of substantial importance and that such location will depend upon factors such a the contruction of the tangs, the commutator diameter, and the characteristics of the wire. It is presently believed preferable to locate the sharp edge radially nearer the armature shaft than the outermost portions of the tangs, and more precisely, at substantially the same radial distance from the shaft as are the radially innermost portions of the tangs. It is also considered desireable to position the sharp edge 196 axially as close to the tangs as the geometry of the parts will permit.

The tang termination procedures of this invention are especially useful for use with start wires. However, essentially the same procedures could be used for finish wires except that the finish wires may not be looped around the tang in the same manner that the start wire is looped. Also, in preparation for finish wire termination, the freshly wound armature is rotated to a position wherein the finish wire portion leading to the flier is so located that it can be gripped by the wire clamp 150. It is expected that the finish wires can, in many cases, be severed against edges of their associated tangs by gripping them with the wire clamps, such as clamp 150, and abruptly pivoting the clamps as taught by said Compton and Seitz U.S. Pat. No. 3,812,577.

The connections of finish wires to the tangs are normally not subjected to the stresses applied to the start wires and less secure finish wire connections are often tolerable. However, the application of the instant invention to finish wire tang connections would be useful in those cases in which the wires might fail to reliably break at the tang edges. Since the sharp edge 196 can be machined to be exceedingly sharp, and since commutator tang edges are not invariably sharp or made to close tolerances, the practice of the instant invention considerably increases the likelihood of the wire breaking where it is designed to break. Satisfactory procedures for practicing this invention in connection with finish wires would be readily apparent to those familiar with the art and therefore no such procedures are described in detail herein. Of couse, the armature would be rotated to a position in which the finish wire would extend over the sharp edge 196 in preparation for the wire to be severed by an abrupt pivotal movement of the wire clamp 150.

The armature winding machine 60 may be controlled by entirely conventional machine control circuitry as diagrammed in FIG. 1. Such circuitry is well known and therefore is not described in detail herein.

It should be apparent that various modifications may be made in the start wire connection methods described above. For example, the practice of looping the start wire two times around the start tang in accordance with said Doyle U.S. Pat. No. 3,713,208 could be employed before the wire is severed. The teaching above of rotating the inner shield 122 to expose the start tangs in preparation for the severing of the wire is desirable to enable the wires to be cut as close as possible to the tangs. It is readily apparent, however, that there may be many occasions in which such rotation of the inner shield is not required.

Although the presently preferred embodiment of this invention has been described, it will be understood that various changes may be made within the scope of the appended claims.

Having thus described my invention, I claim:

1. In an armature winding machine for winding an armature of the type having an armature shaft, a core having coil-receiving slots mounted on said shaft, and a commutator mounted on said shaft, said commutator having coil lead-receiving tangs,
   said armature winding machine having a winding station,
   means for holding an armature in said winding station,
   at least one wire guiding flier for winding coils of wire in said coil-receiving slots,
   wire clamp means actuated to grip a stretch of wire extending from said flier at the end of the winding of one armature in said winding station until the commencement of the winding of the next armature in said winding station, and
   drive means for moving said wire clamp means,
   the improvement comprising:
   wire trimmer means having a sharp edge,
   means supporting said wire trimmer means for movement between a first position wherein said sharp edge is closely adjacent a commutator tang located at a predetermined rotary position in said winding station and a stretch of wire extending from said tang to said wire clamp means extends over said sharp edge and a second position wherein said sharp edge is substantially spaced from said tang, and
   said drive means moves said wire clamp means in a direction generally perpendicular to said sharp edge to create a high concentration of stresses in the wire extending over said sharp edge thereby to sever said stretch of wire at said edge.

2. The improvement of claim 1 wherein said sharp edge is located between said commutator and the core of said armature when said stretch of wire is severed.

3. The improvement of claim 2 wherein said sharp edge is formed at the junction of two surfaces of said trimmer means that intersect the armature shaft so that said sharp edge confronts said shaft, and said drive means moves said wire clamp means in a direction such that the part of the wire gripped thereby is pulled substantially radially with respect to the longitudinal axis of said armature shaft.

4. The improvement of claim 3 wherein said means supporting said wire trimmer means for movement and said means for moving said wire trimmer means are constructed to cause said sharp edge to be moved between said first and said second positions in a direction essentially radially to said longitudinal axis of said armature shaft.

5. In an armature winding machine for winding an armature of the type having an armature shaft, a core having coil-receiving slots mounted on said shaft, and a commutator mounted on said shaft, said commutator having coil lead-receiving tangs
   said armature winding machine having a winding station,
   means for holding an armature in said winding station, at least one wire guiding flier adapted to rotate to wind coils of wire in said coil-receiving slots,
   a commutator shield assembly comprising an inner shield having at least one notch for exposing a commutator tang to enable wire leading from said flier to be hooked around said exposed tang, and an outer shield movable between a first, extended position in which it covers said notch and a second, retracted position wherein it uncovers said notch, wire clamp means actuated to grip a stretch of wire extending from said flier at the end of the winding of one armature in said winding station until the commencement of the winding of the next armature in said winding station, and drive means for moving said wire clamp means, the improvement comprising:

wire trimmer means having a sharp edge, means supporting said wire trimmer means for pivotal movement between a first position wherein said sharp edge is substantially spaced from said tang to a second position wherein said sharp edge is closely adjacent a commutator tang located at a predetermined rotary position in said winding station and a stretch of wire extending from said tang to said wire clamp means extends over said sharp edge, wire trimmer drive means interconnecting said outer shield and said wire trimmer means for moving said wire trimmer means to its said first position when said outer shield is moving to its first, extended position and moving said wire trimmer means to its said second position when said outer shield is moving to its second, retracted position, and wherein said drive means moves said wire clamp means in a direction generally perpendicular to said sharp edge to create a high concentration of stresses in the wire extending over said sharp edge thereby to sever said stretch of wire at said edge.

6. The improvement of claim 5 further comprising means for moving said outer shield to a third, partly retracted position intermediate said first and second positions while coils are being wound to remove it from the direct path of the wire so that the wire will be drawn deeper into said coil-receiving slots as the flier rotates, and means for rotating said inner shield to position said notch out of the path of the wire when said outer shield is stationed in said third position.

7. The improvement of claim 6 wherein said drive means for said wire trimmer moves said wire trimmer into a third position intermediate its said first and second positions and out of the path of the wire being wound into coils when said outer shield is moved into its said third position.

8. The improvement of claim 6 wherein said wire trimmer means comprises an elongate arm pivoted adjacent one of its ends to a part fixed in relation to the bed of the machine and said wire trimmer drive means comprises a part fixed in relation to said outer shield engaging said and thereby causing said elongate arm to pivot.

9. The improvement of claim 8 wherein said wire trimmer means further comprises a trimming member and means connecting said trimming member to the other end of said elongate arm in an adjustably fixed position, said sharp edge being formed on said trimming member.

10. In a method of machine winding an armature of the type having a commutator with wire receiving tangs utilizing a flier type armature winder, the method being of the type wherein there is a wire segment gripped by a clamp and engaging a commmunator tang, the improvement comprising the severing of said wire segment closely adjacent said tang by providing a wire trimming member having a sharp edge, engaging said wire segment at the point where it is to be severed by said sharp edge by moving said trimmer member relative to said armature, and moving said clamp in a direction to cause said wire to be stretched across said sharp edge.

11. In a method of machine winding an armature of the type having a commutator with lead recieving tangs utilizing a flier type armature winding machine, the improvement comprising the steps of:
(1) clamping the wire extending from the flier by a clamp,
(2) locating the armature in the winding machine with a selected tang in position to receive a start wire,
(3) rotating the flier as required to loop the wire about said selected tang whereupon a wire segment extends from the clamped portion thereof to the selected tang,
(4) relatively moving the armature and a wire trimming member having a sharp edge so that said sharp edge and said selected tang are closely adjacent one another and said wire segment extends over said sharp edge, and
(5) severing said wire segment at said sharp edge by moving said clamp away from said sharp edge.

12. The method of claim 11 wherein said wire trimming member moves in a generally vertical path that is generally radial with respect to the armature shaft, said wire is connected to said selected tang when said selected tang is not aligned with said vertical path and wherein said relative movement of said armature and said wire trimming member includes a rotary movement of said armature about its longitudinal axis to position said selected tang in substantial alignment with said path.

* * * * *